Patented Oct. 31, 1950

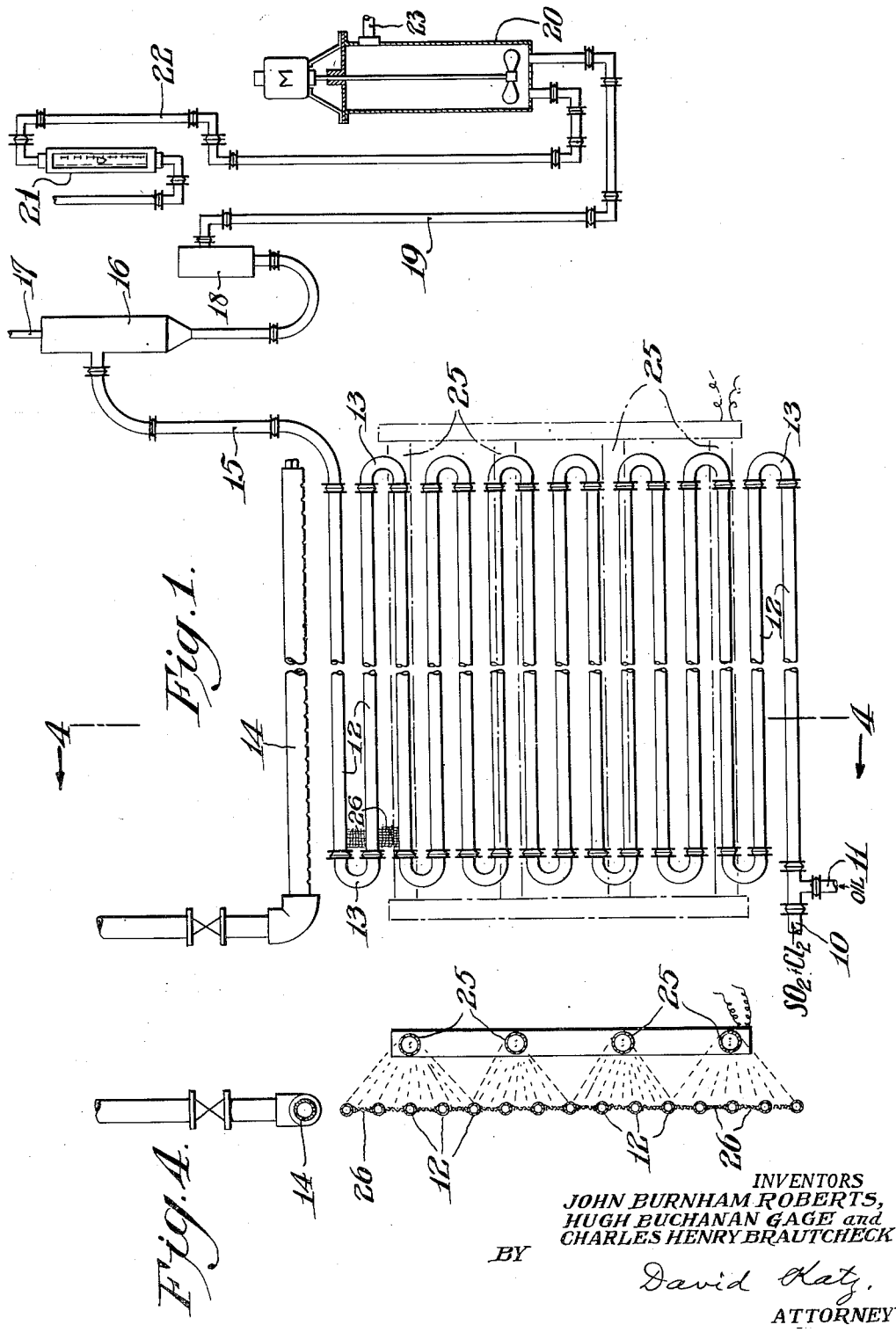

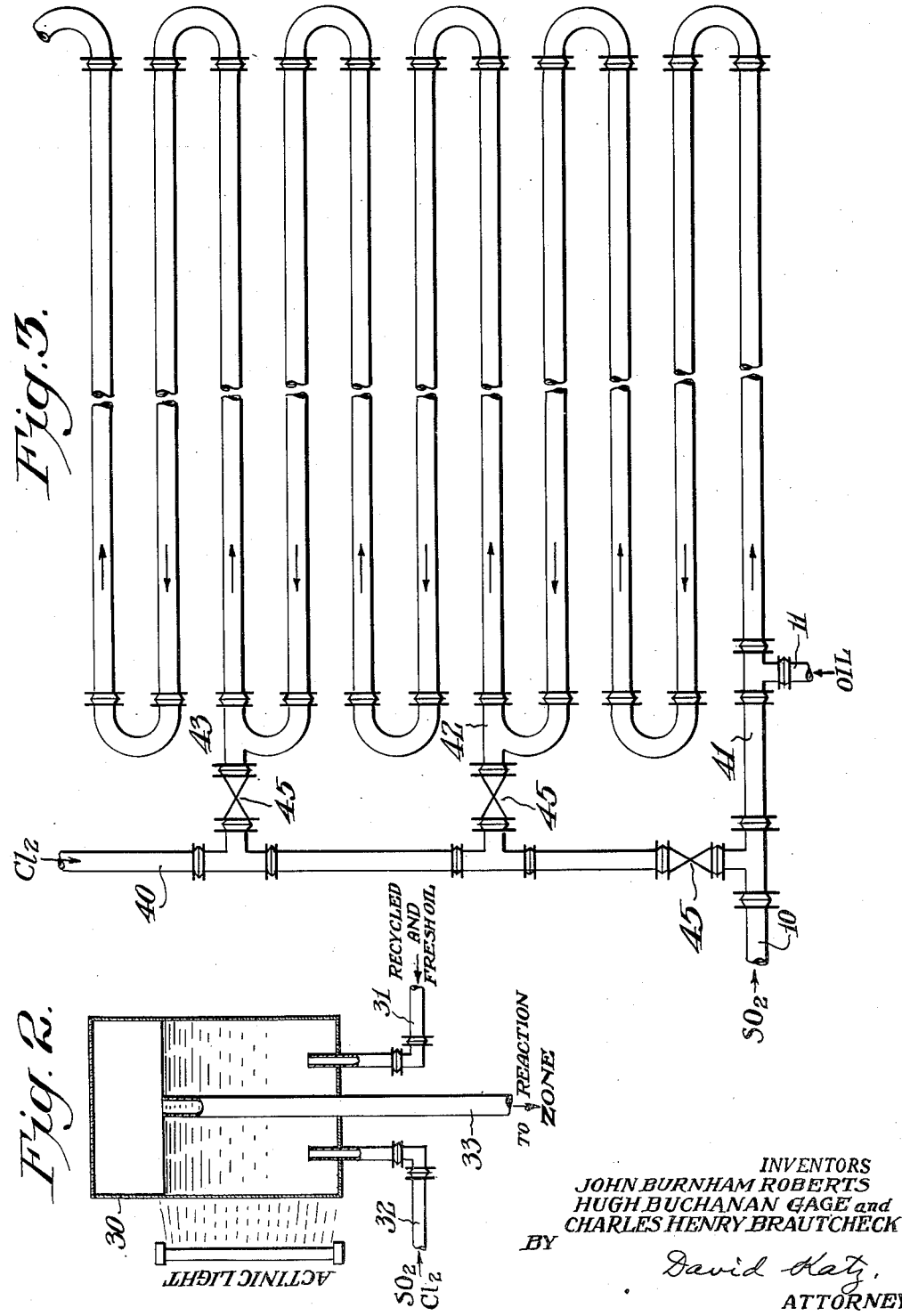

2,528,320

UNITED STATES PATENT OFFICE 2,528,320

CONTINUOUS PHOTOCHEMICAL PREPARATION OF ALIPHATIC SULFONYL CHLORIDES

John Burnham Roberts and Hugh Buchanan Gage, Wilmington, and Charles Henry Brautcheck, Bear, Del., assignors to E. I. du Pont de Nemours & Company, Wilmington, Del., a corporation of Delaware Application July 31, 1946, Serial No. 687,412

5 Claims. (Cl. 204—162)

This invention relates to a method of preparing aliphatic sulfonyl halides and in its more limited aspects, to the preparation of saturated aliphatic hydrocarbon sulfonyl chlorides by carrying out the reaction between a saturated aliphatic hydrocarbon, gaseous sulfur dioxide and chlorine under novel conditions brought about by use of a novel type of reactor. In a more general sense, this invention deals with a practical method for effecting in a continuous manner, on a commercial scale, chemical reactions wherein the reaction mass tends to foam badly, producing a relatively stable foam which is difficult to break up.

In chemical reactions wherein a gas and a liquid are interacted, or wherein a gas is the reaction product or a by-product in the interaction of liquids, the tendency of the reaction mass to foam constitutes a difficult engineering problem, in that it is difficult to produce a continuous, commercial-scale process without unduly increasing the bulk of the apparatus, thereby increasing the cost of the installation and decreasing the production of the entire plant per cubic foot of building capacity. This is particularly the case in the reaction of saturated aliphatic compounds in liquid state with a mixture of sulfur dioxide and chlorine for the purpose of producing the corresponding aliphatic sulfonyl chlorides. The problem of foaming here not only makes the apparatus complicated, but interferes with the reaction itself inasmuch as the foam interferes with proper irradiation of the reaction mass with actinic light.

Accordingly, this invention has as an object to provide a process and means for the preparation of aliphatic sulfonyl chlorides in a continuous manner. Another object is to provide a process and means for producing aliphatic sulfonyl chlorides in a more economical manner than has been possible heretofore. A still further object is to provide a method for producing aliphatic sulfonyl chlorides in a manner which permits control of the reaction with greater facility than has been known in the prior art. Other and further important objects of this invention will appear as the description proceeds.

Now according to this invention, these objects are accomplished by passing a saturated aliphatic compound, at relatively high velocity, through a transparent tube cocurrently with a gaseous mixture of sulfur dioxide and chlorine and irradiating the mixture from the outside with actinic light. The motive power for carrying the reaction mixture through the tube is furnished by the gaseous reactants and products of reaction, there being a pressure drop from the entering end of the tube to the exit end. The temperature of the reaction is regulated by means of a cooling liquid flowing over the tube. The flow of sulfur dioxide and chlorine through the tube is adjusted so that an extremely turbulent contacting of the reactants is maintained. The high velocity often causes the liquid reaction mass to distribute itself circumferentially over the entire inside of the tube forming a liquid-surrounded void along the axis of the tube, in a manner known as turbannular flow which is characterized by high turbulence and thorough intermingling of the reaction fluids. At velocities not quite so high but approaching the above, the liquid forms a partial annulus or crescent around the inside of the tube, but still manifests high turbulence and intermingling. We find that under these conditions the reaction proceeds efficiently with very high yields of superior-quality product, and that, furthermore, foaming in the reactor is very much reduced if not completely eliminated.

In some instances, in our improved process, it may be found desirable to isolate one section of the tubular apparatus from the falling curtain of cooling liquid, allowing the temperature to rise inside that particular section. Under these conditions, foaming may take place in the isolated section. But here again we find that the manner in which we carry out the reaction, in accordance with this invention, discharges the reaction mass at a sufficiently high velocity to enable us to achieve defoaming by discharging the reaction mass directly into a cyclone separator or an equivalent gas separating device.

For a clearer understanding of our invention, reference is now made to the accompanying drawings, in which Figure 1 is a diagrammatic vertical view of our apparatus assembly, showing the main reactor and some of the auxiliary apparatus.

Figure 2 is a diagrammatic vertical view of the induction cell to be described later.

Figure 3 is a fragmentary vertical view of the main reactor with the principal feed lines and connections, as employed in an optional, modified form of our invention described in Example 3 hereinbelow.

Figure 4 is a vertical section through the bank of tubes, taken transversely to the direction of flow, at line 4—4 of Figure 1.

Taking up now the discussion of our invention in detail, our process may be illustrated in its simplest form by reference to Figure 1. The gaseous mixture of sulfur dioxide and chlorine is introduced at 10 and the oily organic compound (usually a hydrocarbon) at 11. The gases are obtained from the respective liquids by conventional means and measured by conventional devices not shown. The hydrocarbon is fed in by means of a conventional positive pressure pump which delivers it to inlet 11 at a pressure exceeding the back pressure of the system at that point. The mixture of gases and hydrocarbon is thus forced by the pressure of the gases through Pyrex glass pipes 12, 12 connected by Pyrex glass return bends 13, 13. During this passage the mass is irradiated by actinic light from a bank of mercury-vapor, fluorescent lamps 25 (Fig. 4) suitably mounted in the vicinity of the tubes. The formation of hydrocarbon sulfonyl chloride takes place during the passage through the pipes and is accompanied by the evolution of heat. The reaction is cooled by chilled water cascading from the distributing trough 14 over the Pyrex pipe lengths 12.

The resulting mixture of hydrocarbon sulfonyl chloride, hydrogen chloride, any excess sulfur dioxide, and unreacted hydrocarbon is carried from the end of the reaction zone through the Pyrex pipe 15 to a gas disengaging vessel 16, which may be made likewise of Pyrex glass or may be a regular cyclone separator built of acid resistant material. The gases are disengaged and pass out the vent 17 for suitable disposal. The liquid reaction products pass to a specific gravity indicator 18 and then through pipe 19 to the hydrolyzer 20 where they are intimately mixed with sodium hydroxide solution which is measured through rotameter 21 and is fed in through line 22. The hydrocarbon sulfonyl chlorides are thus hydrolyzed to the corresponding sodium sulfonate derivatives. The crude hydrolysis mass then passes out through outlet 23 and is worked up in a conventional manner. The continuous hydrolysis step illustrated is old in the art (U. S. 2,193,824) and is included in this description merely for the sake of completeness.

The procedural aspect of this invention will now be more particularly described by the aid of a few specific, illustrative examples. The reaction in Examples 1, 2, 3 and 4 hereinbelow was carried out in the following apparatus. Fifteen lengths of Pyrex glass pipe, ½-inch inside diameter and 6 feet long, were mounted on a frame in a vertical bank and connected with Pyrex glass return bends on 2¼-inch centers as illustrated in Figure 1. A 1-inch pipe with a series of holes on the under side was fixed over the uppermost horizontal length so that chilled water could be allowed to flow down over the Pyrex pipe. Four 85-watt fluorescent lamps were supported nearby in horizontal position, at equidistant vertical spacing with respect to the vertical bank of Pyrex pipe, so as to furnish actinic light for the reaction. Sulfur dioxide and chlorine gases were generated by heating the respective liquids and measuring the gases through rotameters to the reactor. The hydrocarbon was fed in by means of a pump and measured through a rotameter.

*Example 1*

Into the apparatus set up as described above, were passed per hour 22.5 lbs. (3.36 gallons) of a saturated aliphatic petroleum white oil (boiling range: 263° to 305° C.; specific gravity at 15.5° C.=0.801), 8.0 lbs. of sulfur dioxide (44.8 cubic feet) and 5.1 lbs. of chlorine (25.8 cubic feet.) Chilled water at 5° C. was trickled over the tubing and a maximum temperature of 25° C. was noted at the end of the third length of Pyrex pipe. Elsewhere the temperature varied to about 10-12° C. The effluent liquid reaction mass per hour weighed 29.75 lbs. and had a specific gravity 0.935 at 30° C.; virtually no chlorine could be detected in the vent gases. On continuous hydrolysis with sodium hydroxide, there was obtained 12.0 lbs. of aliphatic sodium sulfonate per hour. This corresponds to a conversion of approximately 37% of the hydrocarbon to the aliphatic sodium sulfonate. Upon dilution of the crude hydrolysis mass with water and ethyl alcohol, the unreacted hydrocarbon is separable and may be returned to the reactor for sulfonylation, either alone or mixed with fresh hydrocarbon.

When the unreacted oil is recycled with fresh oil it is found that the reaction mass has an inhibition period which is of the same order of magnitude as the length of time that the oil remains in the reaction zone of the ractor. This trouble may be overcome by passing the recycled oil, either alone or in admixture with fresh oil, through an induction cell, as shown in Figure 2, wherein 30 is a large Pyrex pipe section holding about 2 gallons. The oil is entered through inlet 31; through inlet 32, a very small amount of the gaseous sulfur dioxide and chlorine mixture is passed in. The mixture of oil and gas leaves through outlet 33 which serves also to maintain a constant level in the reservoir, and thereby determine the period of dwell of the oily mixture in the induction cell. During this period, the mass is irradiated with actinic light from a suitable source outside the cell. In this way the inhibition period of the recycled oil is overcome and further reaction is carried out in the reaction zone of the reactor as usual.

*Example 2*

Into the tubular arrangement of Example 1, were passed per hour 23 lbs. of a mixture of paraffin wax and petrolatum (85% fully refined paraffin wax, M. P. 120-122° F., A. S. T. M. and 15% white petrolatum), with 8.25 lbs. of sulfur dioxide and 5.3 lbs. of chlorine. The reaction zone was cooled with water at 47° C. and the maximum temperature was 64° C. in the reaction zone. The effluent liquid reaction product weighed 28.25 lbs. On hydrolysis with 40% sodium hydroxide solution a thick paste was obtained which was nearly white in color. The product is a valuable softening agent (see U. S. Patent 2,334,764). When this reaction is carried out in the conventional batch procedure the product has a tan or brown color.

*Example 3*

The equipment of Example 1 was modified according to Figure 3 to permit distributed introduction of the chlorine into the reactor. The sulfur dioxide was all introduced at 10, but the chlorine feed was divided by means of manifold 40 into essentially equal streams introduced at 41, 42 and 43 (first, fifth and ninth tube respectively), the flow of the chlorine being controlled by valves 45, 45. The hydrocarbon was introduced at 11 as in Figure 1. 36 lbs. of the white oil identified in Example 1, 13.0 lbs. of sulfur dioxide and 8.9 lbs. of chlorine were passed in per hour. Seven lamps of the same type as in Example 1 were used. The temperature of the cooling water was 6° C. and the maximum temperature in the reactor was 22° C. There was obtained a liquid effluent of 48.25 lbs. with a specific gravity of 0.937 at 30° C. The yield of aliphatic sodium sulfonate after hydrolysis was 24.5 lbs. per hour. It is thus evident that a considerable increase in capacity of the reactor is obtainable by using the multipoint chlorine feed. The active ingredient solution obtained was of a very pale yellow color and was an excellent wetting agent and detergent.

*Example 4*

The run of Example 1 was repeated with the exception that the hydrocarbon feed was cut to one-half its value. This gave a product which contained approximately two sulfonate groups per molecule and roughly 85% of the hydrocarbon was reacted. The product after hydrolysis with 50% sodium hydroxide, was useful as the synthetic detergent in a sea-water soap bar composition.

*Example 5*

A section of a pilot plant consisting of 11 horizontal, "one-inch" Pyrex glass tubes was built in the general fashion of Figure 1. (A complete unit would require about 30 tubes.) The reaction bank was irradiated by ten 85-watt fluorescent lamps. The cooling water was carried from one tube to the next by means of small sections of screen 26 placed vertically between adjacent tubes as shown in Figure 4.

Into this reactor was passed a hydrocarbon oil having the same characteristics as in Example 1, together with sulfur dioxide and chlorine. The rates of flow were varied but the illumination was kept constant, and the per cent of chlorine in the residual gases at the end was determined in each case. The data are given in the following table:

|  | Run #13 | Run #6 | Run #16 |
|---|---|---|---|
| Oil Feed, Lbs./Hr | 64.5 | 119.0 | 179.3 |
| SO₂ Feed, Lbs./Hr | 30.1 | 54.6 | 92.6 |
| Cl₂ Feed, Lbs./Hr | 18.2 | 35.8 | 43.1 |
| Liquid "Holdup", Liters | 5.01 | 3.92 | 3.55 |
| Liquid Holdup Time, Minutes | 8.13 | 3.45 | 2.06 |
| Residual Chlorine, Per Cent | 8.8 | 14.2 | 21.3 |
| Chlorine consumed, Per Cent | 91.2 | 85.8 | 78.7 |

The chlorine consumption may be taken as an index of the total amount of oil converted in any given period of time. It will be noted by comparing Run #16 in the above table with Run #13, that as the chlorine feed was stepped up from 18.2 lbs./hr. to 43.1 lbs./hr., the percentage of chlorine consumed dropped only from 91.2 to 78.7. The chlorine consumed per hour thus was 16.6 lbs. in Run #13 and 34.0 lbs. in Run #16. In other words, increasing the feed rate 2.36 times increased the total quantity of oil converted about 2.05 times. Thus, as the rate of feed in our invention is increased, the yield does not drop much, but keeps pace with the feed in substantially constant proportion, especially if increasingly stronger illumination is employed.

This is a factor of tremendous economic significance, as will be readily apparent, for it enables increasing the productivity of given plant installation by the simple expedient of increasing the rate of feed. The total liquid phase reaction increases almost directly with the feed rate and increased velocity of reactants in spite of the fact that the period of dwell of the liquid is substantially reduced. The observed facts may perhaps be explained by the circumstance that under increasing velocities the turbulence of the reaction mixture increases, with resultant more thorough intermingling of the reactants.

The apparatus for carrying out the reaction may be varied considerably from the pilot plant reactor described above. Pyrex glass is preferably used for the construction, but the apparatus may be built of any other material which will transmit the actinic light and will not be attacked by the chemicals in the reaction. Thus, quartz may be used or other compositions of glass which transmits ultra-violet light. Ordinary glass is less efficient, but workable.

The actinic waves are those light waves of 3000–5800 Angstrom units in length. Any source of illumination supplying these wave-lengths may be employed, including sunlight, incandescent lamps, carbon arcs, rare gas lamps, mercury vapor lamps, fluorescent lamps. As typical illustrations of commercially available high power, mercury-vapor lamps for plant scale production may be mentioned a 3000-watt, photo-chemical lamp and a 4280-watt lamp. In general, however, any commercial type of lamp adapted to supply wave-lengths within the specified range may be employed.

The arrangement of successive tubes in the reactor need not be vertical, but may be offset to give two or more vertical banks which would provide a reactor of less height. The total length of pipe in the reactor may be several times that of the pilot plant described. The diameter of the pipe may be increased to one and a half or two inches, or even more if desired. At the same time the number of multiple chlorine inlets along the length of the reactor may be increased.

The direction of flow of the gases and liquid may also be reversed, introducing both at the top of the reactor and withdrawing them at the bottom. The rate of flow of gases through the reactor is such that the direction of overall flow is immaterial.

The absolute velocity of the reaction mass within the tubular reactor is a variable which depends first of all on the diameter of the tube selected and secondly on the desired rate of feeding through the apparatus, which as already indicated, is permissible of variation within wide limits. But by way of illustration it will be stated that the superficial gas velocity at the outlet end of the apparatus in Examples 1, 2 and 4 above was of the order of 14 ft. per second. By "superficial gas velocity" here we mean the velocity calculated on the empty-cross-section of the tube; since part of the tube is in practice occupied by liquid, the actual gas velocity is higher; but the superficial velocity, as defined, forms a convenient index for comparing the performance under various conditions. The tube employed in Examples 1, 2 and 4 had an internal diameter of ½ inch. In Example 5, the "one-inch" tube employed had an internal diameter of 1.19 inches, and a total length of about 107 ft., giving a length-to-diameter ratio of over 1000; the superficial gas velocities at the outlet ranged from 7.5 to about 21 ft. per second. In a third apparatus employed by us, using a tube of 2.22" I. D., the superficial gas velocity was 14 ft./sec. at the inlet and 23 ft./sec. at the outlet. There is no theoretical upper limit to the gas velocity, and superficial velocities of 100 ft./sec. or even 150 ft./sec. are quite within the realm of practical possibility. But for practical purposes high velocity, in this specification and claims shall be understood as referring to a velocity of at least 10 ft./sec. at atmospheric pressure.

The pressure at the inlet of the reactor is determined by the desired velocity of the reaction mixture, the length of the reactor and the discharge pressure. Inlet pressures anywhere between 1 and 4 atmospheres gage will generally achieve this purpose for atmospheric-pressure discharge. However, it is possible to operate the entire apparatus under pressure if desired, that is by providing a pressure head at the outlet end as well as at the inlet end. Or again, suction may be applied at the outlet end, thereby diminishing the pressure throughout the apparatus.

The cooling of the reaction tubes is preferably done by cascading chilled water over them. Other cooling media, however, may be used, for instance brine (an aqueous solution of sodium chloride or of calcium chloride), or an aqueous solution of ethylene glycol or similar antifreeze. If the hydrocarbon has a high melting point, warm water may be used. The cooling water is preferably recirculated through a non-ferrous system to avoid accumulating rusty deposits on the tubes which would restrict the irradiation of the reactants with actinic light. Alternatively, the coolant may be sprayed on the pipes or a transparent jacket may be put around the pipes and a cooling medium passed through the jacket. Again, a narrow glass cell may be constructed around the bank of tubes and the coolant circulated through it. The temperature allowed within the reaction mass will vary, depending on the material employed for chlorosulfonylation. As a rule, the lowest economically attainable temperature is desirable, without solidifying the reaction mass.

Other starting materials than saturated aliphatic hydrocarbons may be used to form sulfonyl chlorides. Thus, long-chain saturated alcohols, esters, and carboxylic acids ($C_8$ or higher) will undergo reaction to form the respective sulfonyl chlorides. In the case of hydrocarbons, the process may be applied to any saturated aliphatic hydrocarbon which is liquid at some temperature between $-5°$ C. and $100°$ C., inasmuch as the cooling liquid may be selected so as to keep the reaction mass within this temperature range. As instances of suitable hydrocarbons, under these circumstances, may be named butane, hexane, cyclohexane, iso-octane, kerosene, cetane, paraffin wax, and the like. In all cases there should be no unsaturation in the aliphatic portion of the molecule where simple chlorine substitution or addition would occur.

In lieu of the gaseous mixture of $SO_2+Cl_2$, sulfuryl chloride (and a catalyst; see U. S. P. 2,383,319) may be used in admixture with sulfur dioxide, the latter providing the gaseous carrier for the reaction mass.

Likewise, in lieu of a mixture of gaseous $SO_2$ and $Cl_2$, a mixture of liquid sulfur dioxide and gaseous chlorine may be used, or even a mixture of both in liquid form. In each case, the liquid constituent when released from its pressure container vaporizes thereby providing vapor for carrying the reaction mixture and incidentally absorbing part of the heat of reaction.

The sufonyl chlorides produced by the method of this invention may be hydrolyzed with alkaline solution to form alkaline salts of the corresponding sulfonic acids, or they may be used in other reactions, known in the prior art, and requiring aliphatic sulfonyl chlorides.

In normal practice with the above reaction of saturated hydrocarbons with sulfur dioxide and chlorine to form hydrocarbon sulfonyl chlorides, it is desirable to have an excess of sulfur dioxide. This minimizes straight chlorination. In the case of the modification wherein chlorine is introduced at multiple points along the length of the reactor (Fig. 3), it is possible to have a considerable excess of sulfur dioxide over chlorine at all points of the reactor, without increasing the overall ratio of $SO_2$ feed to $Cl_2$ feed. In addition, the heat of reaction in this modification is spread out over a considerably greater area and the cooling problem is minimized. This is advantageous because direct chlorination is increased at increased temperatures.

The utilization of chlorine in the process of this invention is essentially complete since the mixture of hydrocarbon and gases is in intimate contact throughout the length of the apparatus. This is a considerable advantage over all prior art processes where the gases pass through the reaction zone by gravity or are dispersed by agitation. A further advantage of our invention is that the apparatus is of cheaper construction than the prior art reactors. It can be modified readily and is readily repaired in case of breakage. It offers much greater facility for the irradiation with actinic light and any type of lamp producing actinic light, such as mercury or carbon arc-lamps, may be used readily.

In this connection it should be pointed out that whereas in the batch reaction a considerable amount of foam blankets the reaction mass, in our improved process, due to the high velocities involved, there is essentially no foam to impede the penetration of actinic light. This is an unexpected advantage of our invention. It is well known in the practice of the art that the hydrocarbon sulfonyl chlorides darken rapidly and easily and that this is accentuated by long times of reaction or standing. In the procedure of this invention, practically colorless products are obtained as compared to yellow or brown products previously obtained. This is probably due to the very short time of contact in the reactor which is on the order of five to ten minutes. The reaction is very simply controlled by adjusting the relative rates of flow of hydrocarbon and sulfur dioxide and chlorine. The extent of reaction is judged by the specific gravity of the effluent liquid reaction mass, and the response to changes in feed rates usually shows up within five minutes. The feed rates may be controlled automatically to yield a product of a specified gravity.

In summary, the invention comprises reacting a saturated aliphatic compound, preferably a hydrocarbon, with gaseous sulfur dioxide and chlorine, under the influence of actinic light, continuously, in co-current flow within a tubular reactor under conditions of turbulent flow.

In the claims hereinbelow the expression "turbannular flow" shall be understood as defining a state of flow wherein a liquid which is being propelled through a horizontal tube in a continuous stream but in quantity insufficient to fill the tube, rises along its edges and wets the entire perimeter of the tube, so as to form a liquid annulus around the inside of the tube. "Approximate turbannular flow" shall be understood as referring to state wherein the liquid does not quite form a complete annulus but nevertheless rises along the edges and wets a substantially larger portion of the inner periphery of the tube than could be wet by the same quantity of liquid flowing in the same tube under streamlined conditions.

We claim as our invention:

1. A process for reacting a liquid, saturated, aliphatic compound with sulfur dioxide and chlorine to produce a sulfonyl-chloride derivative of said aliphatic compound, which comprises passing continuously a mixture of said liquid aliphatic compound and of gaseous sulfur dioxide and chlorine co-currently through a substantially horizontal, transparent tube, while irradiating the tube with actinic light, the proportion of the combined weight of gases to weight of liquid being fed through the apparatus being not less than 0.58:1, and the rate of feed of said reaction mass into said tube being sufficiently high to cause said liquid to be propelled through the tube by said gases and to give the reaction mass at the outlet a superficial gas velocity of not less than 10 feet per second, the reaction mass inside the tube being maintained in a state of turbannular flow as it moves through the tube.

2. A process as in claim 1, the temperature of the reaction mass being controlled by passing a cooling medium continuously over the outside of the tubes.

3. A process as in claim 1, the length of the tube being initially so chosen as to cause the liquid phase to dwell in the tube for a period of about 2 to about 8 minutes.

4. The process of producing a sulfonyl chloride of an aliphatic hydrocarbon, which comprises propelling said hydrocarbon in the liquid state by the aid of a gaseous stream of chlorine and sulfur dioxide through a reaction zone and exposing the moving mass to actinic irradiation in said reaction zone, the velocity of propulsion being sufficiently high to give the reaction gases at the outlet a superficial gas velocity of not less than 10 feet per second and to induce in the moving mass a state of violent agitation corresponding substantially to the state of turbannular flow.

5. A process as in claim 4, the temperature of the reaction mass being controlled by passing a cooling medium continuously over the outside of the tubes.

JOHN BURNHAM ROBERTS.
HUGH BUCHANAN GAGE.
CHARLES HENRY BRAUTCHECK.

REFERENCES CITED

The following references are of record in the file of this patent:

UNITED STATES PATENTS

| Number | Name | Date |
| --- | --- | --- |
| 2,174,492 | Reed | Sept. 26, 1939 |
| 2,193,824 | Lockwood et al. | Mar. 19, 1940 |
| 2,335,259 | Calcott | Nov. 30, 1943 |
| 2,370,786 | Fox | Mar. 6, 1945 |
| 2,428,733 | Asinger | Oct. 7, 1947 |
| 2,436,366 | Sconce | Feb. 17, 1948 |

OTHER REFERENCES

Perry, Chemical Engineers Handbook, (1941), pp. 1061-62.

Martinelli et al., Transactions A. S. M. E., vol. 66, (1944), pp. 139-151.